United States Patent [19]
Kiyani

[11] Patent Number: 5,683,499
[45] Date of Patent: Nov. 4, 1997

[54] FLUID COLLECTING DEVICE FOR COLLECTING MOISTURE FROM TANKS

[76] Inventor: M. Reza Kiyani, 97 Alberta Dr., Amherst, N.Y. 14226

[21] Appl. No.: 975,707

[22] Filed: Nov. 13, 1992

[51] Int. Cl.⁶ .................................................. B01D 53/04
[52] U.S. Cl. .......................................... 96/147; 95/117
[58] Field of Search ............................. 210/689, 238, 210/282; 95/117; 96/147

[56] References Cited

U.S. PATENT DOCUMENTS 3,951,812 4/1976 Hsu .................................... 210/282
4,588,505 5/1986 Walley et al. ....................... 210/502.1
4,758,350 7/1988 Pitts et al. .......................... 210/689

*Primary Examiner*—Ivars Cintins
*Attorney, Agent, or Firm*—Joseph P. Gastel

[57] ABSTRACT

A fluid-collecting device for collecting fluid from a fuel tank having an opening leading to the inside thereof including an elongated bag which is of a size which can pass through the opening, desiccant material in the bag, an elongated cord sewn to the top of the bag, and a disc to which the outer end of the cord is attached, the disc being of a larger size than the opening so that it cannot enter the opening, to thereby provide access to the outer end of the cord which can be grasped to withdraw the bag of desiccant material from the tank.

12 Claims, 2 Drawing Sheets

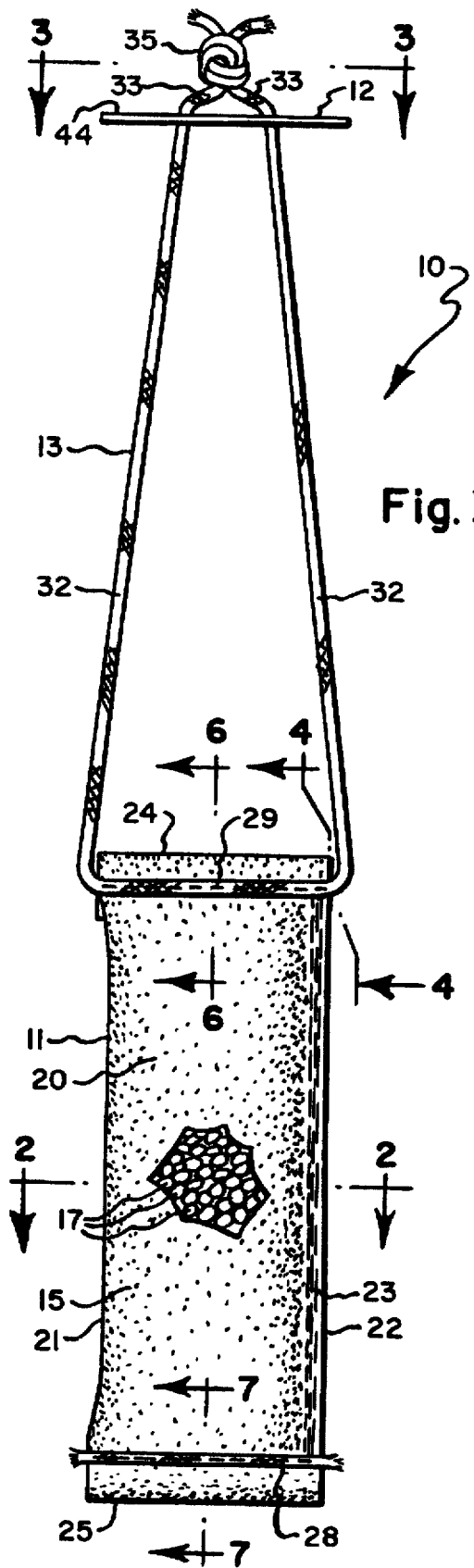
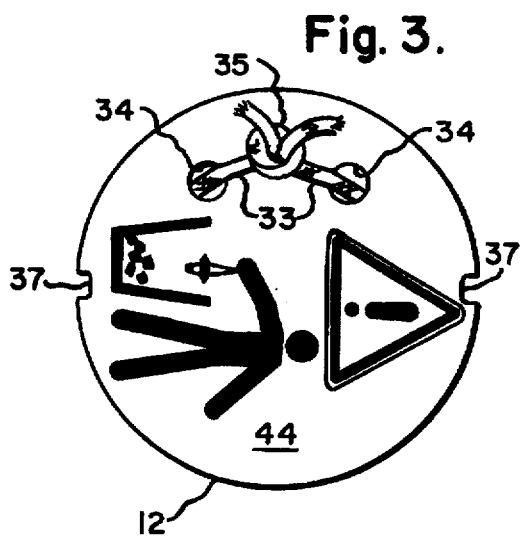
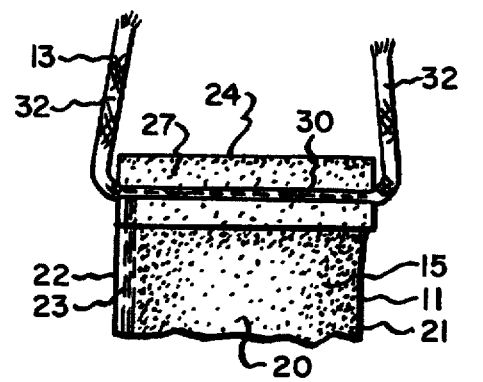
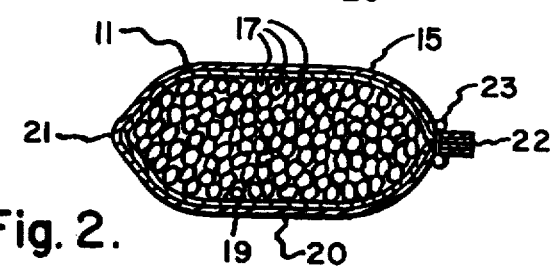

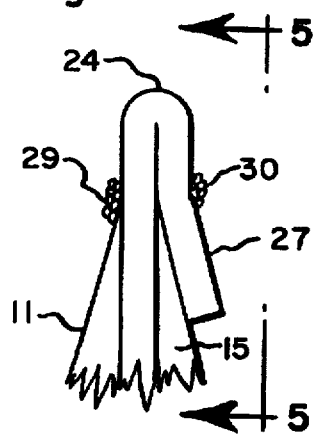
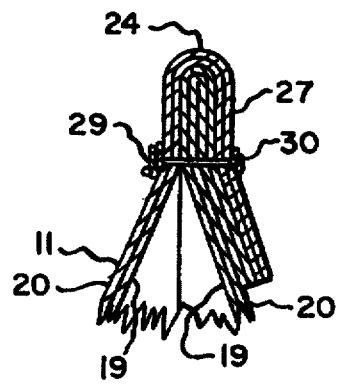
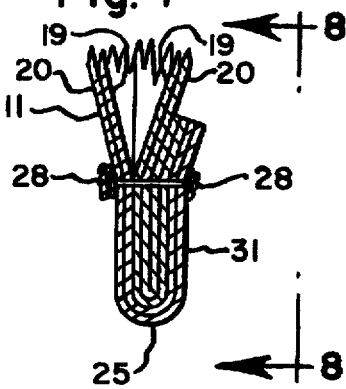
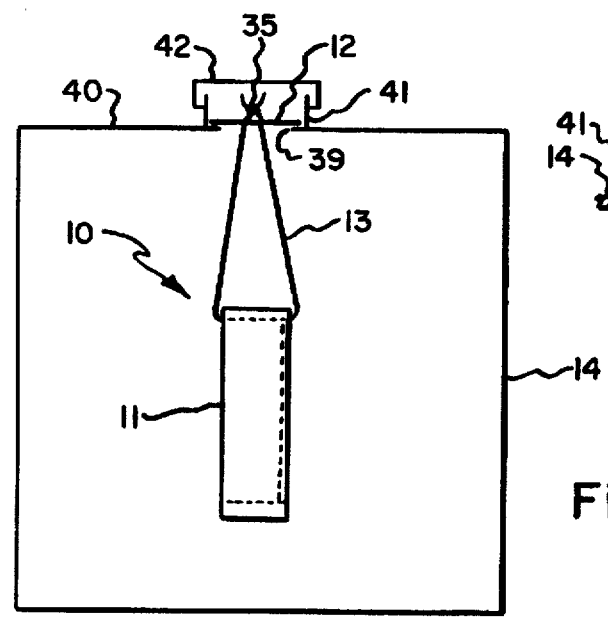
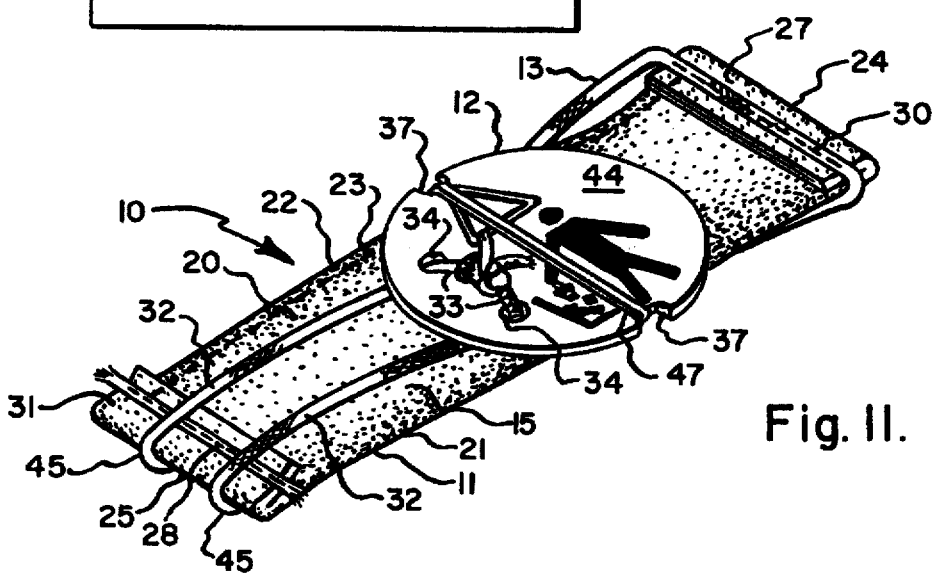

FLUID COLLECTING DEVICE FOR COLLECTING MOISTURE FROM TANKS

BACKGROUND OF THE INVENTION

The present invention relates to a fluid-collecting device for adsorbing fluid from the inside of a tank.

By way of background, in the process of molding plastic fuel tanks, after the tank is molded, it is flushed with water for cleansing purposes. However, all of the water cannot be removed because a residual amount adheres to the inside surface of the tank. It is desired that this residual amount should be removed so that it does not mix with fuel which is thereafter contained in the tank. To this end the fluid-collecting device of the present invention has been developed.

SUMMARY OF THE INVENTION

The present invention relates to a fluid-collecting device in the nature of a desiccant bag which can be placed into a container such as a fuel tank to adsorb water therefrom and which can be withdrawn before the tank is to receive liquid such as fuel.

Another object of the present invention is to provide a fluid-collecting device to adsorb water from the inside of a container such as a fuel tank, the collecting device being constructed in such a manner that it must be withdrawn before the tank can receive liquid such as fuel.

A further object of the present invention is to provide a fluid-collecting device for a container such as a fuel tank which is of a form which can be inserted into the container in a simple expendient manner and which can be withdrawn from the container in a simple and expedient manner.

Another object of the present invention is to provide fluid-collecting devices for a container which are so constructed that they can be shipped in bulk without becoming entangled with each other. Other objects and attendant advantages of the present invention will readily be perceived hereafter.

The present invention relates to a fluid-collecting device for collecting fluid from a container having an opening leading to the inside of the container comprising a porous bag, collecting means in said porous bag for collecting fluid, said porous bag being of a size to fit through said opening for entry into said inside of said container, holding means for being positioned on the opposite side of said opening from said inside of said container, and connecting means for connecting said porous bag with said holding means for pulling said porous bag from said inside of said container after said collecting means has collected fluid from said inside of said container.

The various aspects of the present invention will be more fully understood when the following portions of the specification are read in conjunction with the accompanying drawings wherein:

BRIEF DESCRIPTION OF THE DRAWINGS

FIG. 1 is a front elevational view of the fluid collecting device of the present invention;

FIG. 2 is a cross sectional view taken substantially along line 2—2 of FIG. 1;

FIG. 3 is a view of the holding disc taken substantially in the direction of arrows 3—3 of FIG. 1;

FIG. 4 is a fragmentary cross sectional view taken substantially along line 4—4 of FIG. 1;

FIG. 5 is a fragmentary view of the upper portion of the bag taken substantially in the direction of arrows 5—5 of FIG. 4;

FIG. 6 is a fragmentary cross sectional view taken substantially along line 6—6 of FIG. 1;

FIG. 7 is a fragmentary cross sectional view of the lower portion of the bag taken substantially along line 7—7 of FIG. 1;

FIG. 8 is a fragmentary view taken substantially in the direction of arrows 8—8 of FIG. 7;

FIG. 9 is a schematic view of the fluid collecting device suspended within a container such as a fuel tank;

FIG. 10 is a fragmentary enlarged cross sectional view of the top of the tank with the holding device resting on a shoulder in the neck of the tank; and FIG. 11 is a perspective view of the fluid collecting device of the present invention with its parts oriented for shipment.

DESCRIPTION OF THE PREFERRED EMBODIMENTS

Summarizing briefly in advance, the fluid-collecting device 10 is utilized to collect fluid from the inside of a fuel tank. In this respect, plastic fuel tanks for internal combustion engines are manufactured by molding. After they are molded, the inside of the tank is washed with water. However, after the water is emptied, there is a residual small amount of water which remains on the inner surface of the tank, possibly in the neighborhood of 15 cc. The purpose of the fluid-collecting device 10 of the present invention is to collect the residual water by adsorbing it before the tank is used to receive fuel. In the present case, where the fluid which is to be adsorbed is water, the fluid-collecting device will adsorb any water vapor which is produced as a result of the evaporation of the residual liquid water in the tank, and, in addition, if the fluid-collecting device should actually come into contact with the liquid water, it will adsorb that also. Thus, the fluid-collecting device will actually adsorb the water in both the liquid and gaseous form.

The fluid-collecting device 10 includes a porous bag 11, a cord 13 connected thereto for suspending bag 11 within a tank, and a holding device 12 in the form of a disc to which the cord 13 is attached, with the disc being of a size so it cannot enter the tank and thus will anchor the outer end of cord 13 in a position wherein it can be grasped for withdrawing bag 11 from the tank. The foregoing is schematically shown in FIGS. 9 and 10 wherein the fluid-collecting device 10 is positioned within tank 14.

The porous bag 11 has a double wall 15 (FIG. 2) and it contains desiccant pellets 17 which are silica gel in this instance but can be any other suitable desiccant, such as molecular sieve. The wall 15 is fabricated from an inner material 19 and an outer material 20. The inner material is a porous polyurethane plastic foam which is known under the trademark REEMAY which prevents any dust from the silica gel from passing through wall 15. The outer material 20 is a type of porous rayon which is known under the trademark MELTEX. The bag is formed from a single piece of material which has a return bend or fold 21 at one side thereof with the free ends at 22 being stitched along line 23.

The bag 11 has an upper portion 24 and a lower portion 25. The upper portion 24 is folded over to provide a flap 27. The cord 13 is formed on a sewing machine wherein a main series of threads 29 (FIG. 1) are stitched together with a bobbin thread 30 (FIGS. 4 and 5) to thus sew flap 27 to the remainder of the upper portion of the bag. The bottom portion 25 of the bag remains open to permit the silica gel 17 to be filled into the bag. Thereafter, the lower portion 25 is formed with a flap 31 which is sewn to the adjacent body portion by means of a row of stitching 28.

The cord 13 has portions 32 which extend upwardly from the upper portion of the bag. The extreme ends 33 of portions 32 are threaded through holes 34 in cardboard disc 12 and are knotted at 35. Holes 34 are located on a chord of the circular disc 12, and thus holes 34 are offset from a diameter of the disc which is parallel thereto. This diameter of the disc has notches 37 at opposite ends thereof.

The fluid-collecting device 10, as noted above, is shown in FIG. 9 as suspended within a tank 14 for the purpose of adsorbing fluid therein, although it could lie on the bottom of the tank if the cords 32 were long enough. In use, the elongated tubular body 11 is passed through opening 39 in the top 40 of the tank 14, the opening being located at the end of neck 41 which receives a removable cap 42. An annular shoulder or rim 43 surrounds opening 39, and the diameter of disc 12 is larger than the diameter of opening 39. Thus, disc 12 cannot pass through opening 39, and it will rest on shoulder 43. Therefore, when it is desired to remove porous bag 11 from tank 14, it is merely necessary to grasp the end portion of the cord 13 proximate knot 35 to withdraw the desiccant bag 11 after it has collected the fluid in the tank. At this point it is to be noted from FIG. 3 that the upper side 44 of disc 12 has the universal pictorial symbol indicating that the collecting device 10 should be thrown away.

FIG. 11 depicts how the collecting device 10 is assembled for shipment by the bag fabricator to a tank manufacturer. In this respect, the collecting devices 10 are shipped in hermetically sealed containers containing hundreds of devices 10. If the cords 13 were not anchored, they could intertwine with other cords and, when it is considered that the discs 12 could also be involved, it is quite apparent that there could be tangled masses of devices 10. Accordingly, the arrangement is shown in FIG. 11 wherein the cord ends 32, which are longer than the length of bag 11, are drawn down along one side of the bag and bent at 45 around the lower portion 25 of the bag. The holes 34 will automatically be aligned on a line which extends crosswise to the length of bag 11, and the diameter on which notches 37 lie will also be aligned crosswise to the length of bag 11. A binder in the form of a rubberband 47 is thereafter slipped over the bag, and it will encircle both the bag and the disc, and the rubberband will be anchored in notches 37. Thus, hundreds of devices 10 can be placed in a container for shipment without the probability that the cord portions 32 of various bags will become entangled with each other.

While the fluid collecting device has been specifically described as being used to adsorb fluid in the form of both liquid water and water vapor from a fuel tank, it will be appreciated that it can be used to adsorb fluid of any type, whether gaseous or liquid, from any type of container.

While a preferred embodiment of the fluid-collecting device has been disclosed, it will be appreciated that it is not limited thereto but may be otherwise embodied within the scope of the following claims.

What is claimed is:

1. A fluid-collecting device for collecting fluid from a container having an opening leading to the inside of the container comprising a porous bag, collecting means in said porous bag for collecting fluid, said porous bag being of a size to fit through said opening for entry into said inside of said container, holding means of larger size than said opening for being positioned on the opposite side of said opening from said inside of said container and being incapable of entering into said container by virtue of being of larger size than said opening, and elongated connecting means having one end connected to said porous bag and another end connected to said holding means for pulling said porous bag from said inside of said container after said collecting means has collected fluid from said inside of said container, said holding means by being of larger size than said opening thereby preventing said end of said connecting means connected to said holding means from falling into said container.

2. A fluid-collecting device as set forth in claim 1 wherein said collecting means is a desiccant for collecting gaseous fluid.

3. A fluid-collecting device as set forth in claim 1 wherein said holding means is a disc.

4. A fluid-collecting device as set forth in claim 3 wherein said connecting means comprises a cord.

5. A fluid-collecting device as set forth in claim 1 wherein said collecting means is a desiccant, and wherein said porous bag has a wall with inner and outer layers with said inner layer being located inside of said outer layer for preventing desiccant dust from passing out of said bag.

6. A fluid-collecting device as set forth in claim 5 wherein said holding means is a disc.

7. A fluid-collecting device as set forth in claim 6 wherein said connecting means comprises a cord.

8. A fluid-collecting device for collecting fluid from a container having an opening leading to the inside of the container comprising a porous bag, collecting means in said porous bag for collecting fluid, said porous bag being of a size to fit through said opening for entry into said inside of said container, holding means for being positioned on the opposite side of said opening from said inside of said container, connecting means for connecting said porous bag with said holding means for pulling said porous bag from said inside of said container after said collecting means has collected fluid from said inside of said container, said holding means comprising a disc of larger size than said opening, and said porous bag being an elongated tubular member having first and second ends, and said disc having diametrically opposed notches, and said connecting means comprising a cord which is connected proximate said first end of said tubular member and which is of a length to be wound lengthwise around said second end of said tubular member to cause said disc to be located on said tubular member between said first and second ends thereof with said notches being at the opposite ends of a diameter which extends crosswise to the length dimension of said tubular member, and a binder encircling said tubular member and said disc and passing through said notches to position said disc on said tubular member for shipment.

9. A fluid-collecting device as set forth in claim 8 wherein said binder is a rubberband.

10. A fluid-collecting device for collecting fluid from a container having an opening leading to the inside of the container comprising a porous bag, collecting means in said porous bag for collecting fluid, said porous bag being of a size to fit through said opening for entry into said inside of said container, holding means for being positioned on the opposite side of said opening from said inside of said container, connecting means for connecting said porous bag with said holding means for pulling said porous bag from said inside of said container after said collecting means has collected fluid from said inside of said container, said porous bag being an elongated tubular member having first and second ends, and said connecting means comprising an elongated cord which is secured crosswise to said first end and has first and second lengths thereof extending outwardly from said first end, first and second ends on said first and second lengths, respectively, and said holding means comprising a disc of larger size than said opening, first and second holes in said disc on a chord of said disc for receiving said first and second ends of said first and second lengths, respectively, and securing means for securing said first and second ends to each other on the opposite side of said disc from said porous bag.

11. A fluid-collecting device as set forth in claim 10 including two notches on said disc located at opposite ends of a diameter of said disc which is substantially parallel to said chord.

12. A fluid-collecting device as set forth in claim 11 wherein said first and second lengths of said cords are longer than said elongated tubular member so that they can be wound around said second end and are of a length to locate said disc between said first and second ends of said tubular member with said diameter between said notches extending crosswise to the length dimension of said elongated tubular member, and a binder encircling said tubular member and said disc and passing through said notches to position said disc on said tubular member for shipment.

* * * * *